(12) United States Patent
Kato et al.

(10) Patent No.: US 11,524,589 B2
(45) Date of Patent: Dec. 13, 2022

(54) POWER SUPPLY SYSTEM AND ELECTRIC VEHICLE

(71) Applicant: HONDA MOTOR CO., LTD., Tokyo (JP)

(72) Inventors: Yoshihisa Kato, Saitama (JP); Hirokazu Oguma, Saitama (JP); Kenta Suzuki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/214,911

(22) Filed: Mar. 28, 2021

(65) Prior Publication Data
US 2021/0300188 A1 Sep. 30, 2021

(30) Foreign Application Priority Data

Mar. 30, 2020 (JP) .............................. JP2020-061200

(51) Int. Cl.
*B60L 50/64* (2019.01)
*B60L 58/12* (2019.01)
(Continued)

(52) U.S. Cl.
CPC .............. *B60L 50/64* (2019.02); *B60K 35/00* (2013.01); *B60L 58/12* (2019.02); *H02J 7/0047* (2013.01);
(Continued)

(58) Field of Classification Search
CPC ...... B60L 50/64; B60L 58/12; B60L 2240/42; B60L 2240/54; B60L 2250/10; B60L 2250/16; B60L 50/40; B60L 50/60; B60L 58/14; B60L 58/18; B60L 58/22; B60L 1/00; B60K 35/00; B60K 6/28; B60K 2370/178; H02J 7/0047; H02J 7/0016;
(Continued)

(56) References Cited

U.S. PATENT DOCUMENTS

2011/0187183 A1   8/2011 Kimura
2011/0202197 A1*  8/2011 Hachiya ................. B60L 50/52
                                           307/10.7
(Continued)

FOREIGN PATENT DOCUMENTS

JP          2017099241 A      6/2017

*Primary Examiner* — Lincoln D Donovan
*Assistant Examiner* — Alex W Lam
(74) *Attorney, Agent, or Firm* — CKC & Partners Co., LLC

(57) ABSTRACT

A power supply system includes a first power circuit coupled to a capacity-type first battery and a drive motor, a second power circuit coupled to an output-type second battery, a voltage converter that converts a voltage between the first power circuit and the second power circuit, and a converter ECU and a management ECU that operate the voltage converter to control converter passing power in the voltage converter. The management ECU sets, when a first SOC that is a percentage of charge in the first battery is less than a predetermined lamp-on threshold and a first maximum output P1_lim that is a maximum output of the first battery is more them a predetermined output threshold Pe0 maximum converter passing power Pcnv_max corresponding to maximum power with respect to the converter passing power to 0 to prohibit discharging of the second battery.

18 Claims, 6 Drawing Sheets

(51) Int. Cl.
  *H02J 7/00*    (2006.01)
  *B60K 35/00*   (2006.01)
  *H02P 27/08*   (2006.01)
  *H02M 7/5387*  (2007.01)
  *B60K 6/28*    (2007.10)
  *G07C 5/08*    (2006.01)

(52) U.S. Cl.
  CPC ........ *H02M 7/53871* (2013.01); *H02P 27/08* (2013.01); *B60K 6/28* (2013.01); *B60K 2370/178* (2019.05); *B60Y 2200/91* (2013.01); *B60Y 2200/92* (2013.01); *B60Y 2400/112* (2013.01); *G07C 5/0816* (2013.01)

(58) Field of Classification Search
  CPC .... H02J 7/1423; H02J 7/342; H02M 7/53871; H02P 27/08; B60Y 2200/91; B60Y 2200/92; B60Y 2400/112; G07C 5/0816; Y02T 10/64; Y02T 10/70; Y02T 10/92
  See application file for complete search history.

(56) References Cited

U.S. PATENT DOCUMENTS

| | | | |
|---|---|---|---|
| 2014/0203633 A1* | 7/2014 | Nishi | B60L 15/007 |
| | | | 307/10.1 |
| 2014/0368041 A1 | 12/2014 | Tu | |
| 2017/0151886 A1 | 6/2017 | Oguma | |
| 2017/0232851 A1* | 8/2017 | Unno | B60L 3/0046 |
| | | | 307/10.1 |
| 2017/0305298 A1* | 10/2017 | Takeshima | H02M 3/1588 |

\* cited by examiner

POWER SUPPLY SYSTEM AND ELECTRIC VEHICLE

This application is based on and claims the benefit of priority from Japanese Patent Application No. 2020-061200, filed on 30 Mar. 2020, the content of which is incorporated herein by reference.

BACKGROUND OF THE INVENTION

Field of the Invention

The present invention relates to a power supply system and an electric vehicle. More specifically, the present invention relates to a power supply system including two electric storage devices, and relates to an electric vehicle mounted with the power supply system.

Related Art

Development of electric transportation apparatuses and electric vehicles such as hybrid electric vehicles is growing in recent years. The electric transportation apparatuses each include a drive motor serving as a driving force generation source. The electric vehicles each include a drive motor and an internal combustion engine serving as driving force generation sources. Such an electric vehicle is further mounted with an electric storage device (such as a battery and a capacitor) used to supply electrical energy to the drive motor. Furthermore, development of electric vehicles that are each mounted with a plurality of electric storage devices that differ from each other in characteristic is also growing in recent years.

For example, Japanese Unexamined Patent Application, Publication No. 2017-99241 illustrates a power supply system for an electric vehicle. The power supply system includes a capacity-type first electric storage device primarily aimed to have higher capacity and an output-type second electric storage device primarily aimed to have higher output. The power supply system illustrated in Japanese Unexamined Patent Application, Publication No. 2017-99241 calculates, when a remaining amount of the capacity-type first, electric storage device is less than a predetermined threshold, a maximum output of the first electric storage device to complement, when the maximum output of the first electric storage device drops below a requested output of a driver, insufficient power from the second electric storage device to achieve traveling according to the request of the driver.

Patent Document 1: Japanese Unexamined Patent Application, Publication No. 2017-99241

SUMMARY OF THE INVENTION

By the way, there is an electric vehicle that uses power of two electric storage devices as described above for traveling. The vehicle sets, when a maximum system output that is a sum of a maximum output of the first electric storage device and a maximum output of the second electric storage device is less than a predetermined output threshold, a remaining traveling possible distance to 0.

In here, a case is studied, where, when a remaining amount of the first electric storage device is less than the threshold, i.e., a maximum output of the first electric storage device is around the output threshold described above, insufficient power with respect to a driver's requested output is complemented from the second electric storage device, as illustrated in Japanese Unexamined Patent Application, Publication No. 2017-99241 described above. Since the second electric storage device is an output type primarily aimed to have higher output, as described above, the maximum output of the second electric storage device may drop quickly when power is taken at a large amount from the second electric storage device. Therefore, in the power supply system illustrated in Japanese Unexamined Patent Application, Publication No. 2017-99241, the remaining traveling possible distance may suddenly decrease to 0 before power stored in the first electric storage device is fully used.

An object of the present invention is to provide a power supply system that includes a capacity-type first electric storage device and an output-type second electric storage device, and to provide an electric vehicle mounted with the power supply system, making it possible to fully use power stored in the first electric storage device.

A first aspect of the present invention is directed to a power supply system (for example, a power supply system 1, described later) including: a first power circuit (for example a first power circuit 2, described later) coupled to a first electric storage device (for example, a first battery B1, described later) and an electrical load (for example, a load circuit 4, described later); a second power circuit (for example, a second power circuit 3, described later) coupled to a second electric storage device (for example, a second battery B2, described later) having higher output density and lower energy density than output density and energy density of the first electric storage device; a first remaining-amount parameter acquisition device (for example, a first battery sensor unit 81 and a first battery electronic control unit (ECU) 74, described later) that acquires a first remaining-amount parameter (for example, a first state of charge (SOC) and a first maximum output P1_lim, described later) that increases or decreases in accordance with a remaining amount of the first electric storage device; a first maximum output acquisition device (for example, the first battery sensor unit 81 and the first battery ECU 74, described later) that acquires a first maximum output that is a maximum output (for example, the first maximum output P1_lim, described later) of the first electric storage device; a voltage converter (for example, a voltage converter 5, described later) that converts a voltage between the first power circuit and the second power circuit; and a control device (for example, an electronic control unit group 7, described later) that operates the voltage converter to control a flow of power (for example, converter passing power, described later) between the first power circuit and the second power circuit. The control device restricts, when the first remaining-amount parameter is less than a remaining amount threshold (for example, a lamp-on threshold, described later) and the first maximum output is more than an output threshold (for example, an output threshold Pe0, described later), discharging of the second electric storage device, compared with a case where the first remaining-amount parameter is more than the remaining amount threshold.

A second aspect of the present invention is an embodiment of the first aspect. In the power supply system according to the second aspect, in this case, the control device preferably permits, when the first remaining-amount parameter is less than the remaining amount threshold and the first maximum output is less than the output threshold, discharging of the second electric storage device, compared with a case where the first remaining-amount parameter is less than the remaining amount threshold and the first maximum output is more than the output threshold.

A third aspect of the present invention is an embodiment of the second aspect. In the power supply system according to the third aspect, in this case, the control device preferably sets, when the first remaining-amount parameter is less than the remaining amount threshold and the first maximum output is less than the output threshold, a difference between the output threshold and the first maximum output as maximum power passing from a side adjacent to the second power circuit to a side adjacent to the first power circuit in the voltage converter.

A fourth aspect of the present invention is an embodiment of the first aspect. In the power supply system according to the fourth aspect, in this case, the power supply system preferably further includes a second remaining-amount parameter acquisition device (for example, a second battery sensor unit 82 and a second battery ECU 75, described later) that acquires a second remaining-amount parameter (for example, a second SOC, described later) that increases or decreases in accordance with a remaining amount of the second electric storage device. The control device preferably uses, when the first remaining-amount parameter is less than the remaining amount threshold, the first maximum output is more than the output threshold, and the second remaining-amount parameter is less than a target remaining amount, power in the first power circuit to charge the second electric storage device.

A fifth aspect of the present invention is directed to an electric vehicle (for example, a vehicle V, described later) mounted with the power supply system described in any one of the first to fourth aspects, in which the electrical load includes: a drive motor (for example, a drive motor M, described later) mechanically coupled to drive wheels (for example, drive wheels W, described later); and a power converter (for example, a power converter 43, described later) that converts power between the first power circuit and the drive motor.

A sixth aspect of the present invention is an embodiment of the fifth aspect. In the electric vehicle according to the sixth aspect, in this case, the electric vehicle preferably further includes an information display device (for example, a monitor 92, described later) that a driver is able to see. The control device preferably causes, when the first remaining-amount parameter is less than the remaining amount threshold, the information display device to display warning information regarding a state of the power supply system.

A seventh aspect of the present invention is an embodiment of the sixth aspect. In the electric vehicle according to the seventh aspect, in this case, the warning information preferably includes information of a state where output power to the drive motor is restricted and information regarding a charging request to the first electric storage device.

(1) In the present invention, the first power circuit coupled to the capacity-type first electric storage device and the electrical load and the second power circuit coupled to the output-type second electric storage device are coupled to each other via the voltage converter. The control device operates the voltage converter to control a flow of power between the first power circuit and the second power circuit, i.e., charging and discharging of the second electric storage device. In here, a second maximum output of the output type second electric storage device drops faster than the first maximum output of the capacity type first electric storage device. Therefore, when, for example, the first remaining-amount parameter that has dropped gradually is less than the remaining amount threshold, the first maximum output is more than the output threshold, and discharging of the second electric storage device is not restricted, but is continuously permitted, a maximum system output that is a sum of the first maximum output and the second maximum output may drop below the output threshold before power stored in the first electric storage device is fully used. In the present invention, the control device then restricts, when the first remaining-amount parameter of the first electric storage device is less than the remaining amount threshold and the first maximum output is more than the output threshold, discharging of the second electric storage device, compared with a case where the first remaining-amount parameter is more than the remaining amount threshold. Therefore, it is possible to secure auxiliary power in the second electric storage device until the first maximum output of the first electric storage device drops below the output threshold. Therefore, according to the present invention, it is possible to use power from the second electric storage device to supply necessary power to the electrical load after the first maximum output has dropped below the output threshold, making it possible to fully use power stored in the first electric storage device.

(2) In the present Invention, the control device permits, when the first remaining-amount parameter is less than the remaining amount threshold and the first maximum output is less than the output threshold, discharging of the second electric storage device, compared with a case where the first remaining-amount parameter is less than the remaining amount threshold and the first maximum output is more than the output threshold. Therefore, when the first maximum output is less than the output threshold, it is possible to complement insufficient power (the output threshold–the first maximum output) with power secured from the second electric storage device while the first maximum output is more than the output threshold, as described above, making it possible to prevent a whole system output of the system including the first electric storage device and the second electric storage device from dropping below the output threshold, and to fully use power stored in the first electric storage device.

(3) In the present invention, the control device sets, when the first remaining-amount parameter is less than the remaining amount threshold and the first maximum output is less than the output threshold, a difference between the output threshold and the first maximum output as maximum power flowing from the side adjacent to the second power circuit to the side adjacent to the first power circuit in the voltage converter. Therefore, it is possible to suppress a remaining amount of the second electric storage device from dropping quickly, making it possible to fully use power stored in the first electric storage device.

(4) In the present invention, the control device uses, when the first remaining-amount parameter is less than the remaining amount threshold, the first maximum output is more than the output threshold, and the second remaining-amount parameter is less than a target remaining amount, power in the first power circuit to charge the second electric storage device. Therefore, it is possible to increase the remaining amount of the second electric storage device for preparing a case where the first maximum output of the first electric storage device drops below the output threshold. Therefore, according to the present invention, it is possible to secure a longer period during which it is possible to complement power from the second electric storage device after the first maximum output has dropped below the output threshold, making it possible to fully use power stored in the first electric storage device.

(5) With the electric vehicle according to the present invention, it is possible to keep traveling with the drive motor until the power stored in the first electric storage device is fully used.

(6) In the present invention, when the first remaining-amount parameter is less than the remaining amount threshold and the first maximum output is more than the output threshold, discharging of the second electric storage device is restricted, compared with a case where the first remaining-amount parameter is more than the remaining amount threshold. Therefore, in the electric vehicle, it is impossible to supply power according to a request of the driver to the drive motor, resulting in the driver possibly feeling uncomfortable. The control device then causes, when the first remaining-amount parameter is less than the remaining amount threshold, the information display device to display warning information regarding a state of the power supply system. Therefore, it is possible to suppress uncomfortable feelings in the driver.

(7) In the present invention, the control device causes the information display device to display, as the warning information, information of a state where output power to the drive motor is restricted and information regarding a charging request to the first electric storage device. According to the present invention, it is possible to suppress uncomfortable feelings in the driver when outputting of power to the drive motor is restricted, while prompting charging of the first electric storage device.

DETAILED DESCRIPTION OF THE INVENTION

Figure 1:
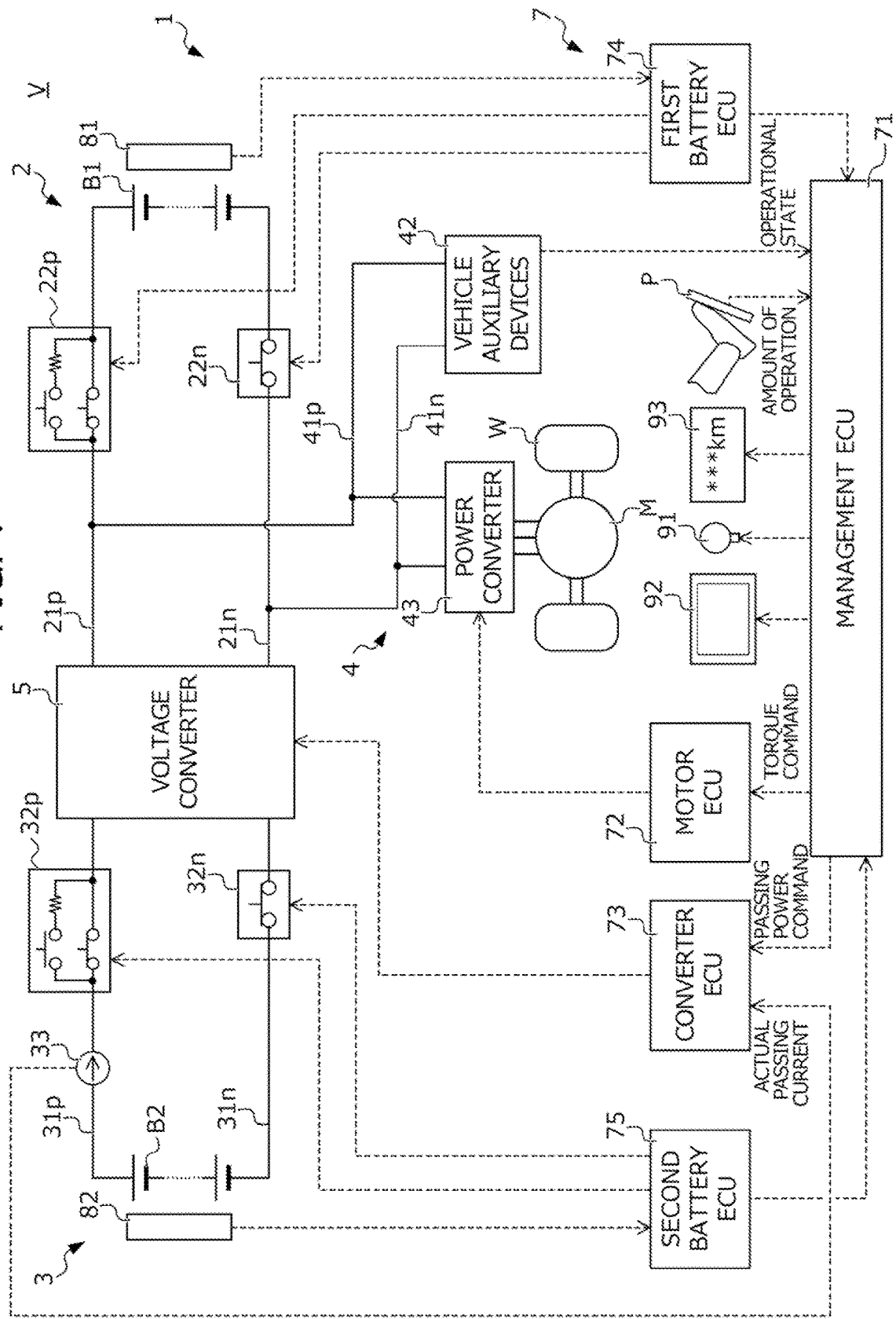
FIG. 1 is a view illustrating a configuration of a vehicle mounted with a power supply system according to an embodiment of the present invention.

An embodiment of the present invention will now be described herein with reference to the accompanying drawings. FIG. 1 is a view illustrating a configuration of an electric vehicle V (hereinafter simply referred to as a "vehicle") mounted with a power supply system 1 according to the present embodiment.

The vehicle V includes drive wheels W, a drive motor M coupled to the drive wheels W, and the power supply system 1 that allows power to be provided and received between the drive motor M and a first battery B1 and a second battery B2 described later. Note that, in the present embodiment, the vehicle V is described to mainly use a driving force generated in the drive motor M for acceleration and deceleration. However, the present invention is not limited to the present embodiment. The vehicle V may be a so-called hybrid electric vehicle mounted with the drive motor M and an engine serving as driving force generation sources.

The drive motor M is coupled to the drive wheels W via a non-illustrated driving force transmission mechanism. As the power supply system 1 supplies three phase, alternating current power to the drive motor M, the drive motor M generates torque. The torque is transmitted, via the non-illustrated driving force transmission mechanism, to the drive wheels W. The drive wheels W rotate. The vehicle V runs. The drive motor M exerts a function of a generator when the vehicle V decelerates to generate regenerative power, and to apply regenerative braking torque corresponding to a magnitude of the regenerative power to the drive wheels W. The regenerative power that the drive motor M has generated is appropriately used to charge the batteries B1 and B2 of the power supply system 1.

The power supply system 1 includes a first power circuit 2 coupled to the first battery B1, a second power circuit 3 coupled to the second battery B2, a voltage converter 5 that couples to each other the first power circuit 2 and the second power circuit 3, a load circuit 4 having various electrical loads including the drive motor M, and an electronic control unit group 7 that controls the power circuits 2 and 3, the load circuit 4, and the voltage converter 5. The electronic control unit group 7 includes computers serving as a management ECU 71, a motor ECU 72, a converter ECU 73, a first battery ECU 74, and a second battery ECU 75.

The first battery B1 is a secondary battery for which it is possible to perform both discharging where chemical energy is converted into electrical energy and charging where electrical energy is converted into chemical energy. A case will be described below, where a so-called lithium ion storage battery is used as the first battery B1, in which lithium ions move between electrodes to perform charging and discharging. However, the present invention is not limited to the case.

The first battery B1 is provided with a first battery sensor unit 81 used to estimate an internal state of the first battery B1. The first battery sensor unit 81 includes a plurality of sensors that detect physical quantities necessary for acquiring, in the first battery ECU 74, a percentage of charge (an amount of stored power in a battery is represented by percentage) corresponding to a remaining amount and a temperature, for example, of the first battery B1, and transmit signals corresponding to the detected values to the first battery ECU 74. More specifically, the first battery sensor unit 81 includes a voltage sensor that detects a terminal voltage of the first battery B1, a current sensor that detects a current flowing in the first battery B1, and a temperature sensor that detects a temperature in the first battery B1, for example.

The second battery B2 is a secondary battery for which it is possible to perform both discharging where chemical energy is converted into electrical energy and charging where electrical energy is converted into chemical energy. A case will be described below, where a so-called lithium ion storage battery is used as the second battery B2, in which lithium ions move between electrodes to perform charging and discharging. However, the present invention is not limited to the case. For example, a capacitor may be used as the second battery B2.

The second battery B2 is provided with a second battery sensor unit 82 used to estimate an internal state of the second battery B2. The second battery sensor unit 82 includes a plurality of sensors that detect physical quantities necessary for acquiring, in the second battery ECU 75, a percentage of charge and a temperature, for example, of the second battery B2, and transmit signals corresponding to the detected values to the second battery ECU 75. More specifically, the second battery sensor unit 82 includes a voltage sensor that detects a terminal voltage of the second battery B2, a current sensor that detects a current flowing in the second battery B2, and a temperature sensor that detects a temperature in the second battery B2, for example.

Here, characteristics of the first battery B1 and characteristics of the second battery B2 will be compared with each other. The first battery B1 has lower output weight density and higher energy weight density than output weight density and energy weight density of the second battery B2. Furthermore, the first battery B1 has a greater capacity than a capacity of the second battery B2. That is, the first battery B1 is advantageous than the second battery B2 in terms of energy weight density. Note that the term energy weight density refers to an amount of power per unit weight [Wh/kg]. The term output weight density refers to power per unit weight [W/kg]. Therefore, the first battery B1 that is advantageous in energy weight density is a capacity type storage battery primarily aimed to have higher capacity. The second battery B2 that is advantageous in output weight density is an output type storage battery primarily aimed to have higher output. Therefore, in the power supply system 1, the first battery B1 is used as a main power supply. The second battery B2 is used as a sub power supply that complements the first battery B1.

The first power circuit 2 includes the first battery B1, first power lines 21$p$ and 21$n$ respectively coupling to each other both positive and negative electrodes of the first battery B1 and a positive electrode terminal and a negative electrode terminal on a high voltage side of the voltage converter 5, and a positive electrode contactor 22$p$ and a negative electrode contactor 22$n$ respectively provided to the first power lines 21$p$ and 21$n$.

The contactors 22$p$ and 22$n$ are a normally open type, i.e., which are each opened when no external command signals are inputted to disconnect from each other both the electrodes of the first battery B1 and the first power lines 21$p$ and 21$n$. The contactors 22$p$ and 22$n$ are each closed when command signals are inputted to couple to each other the first battery B1 and the first power lines 21$p$ and 21$n$. The contactors 22$p$ and 22$n$ open or close in response to command signals transmitted from the first battery ECU 74. Note that the positive electrode contactor 22$p$ is a pre-charge contactor including a pre-charge resistor used to mitigate a rush current flowing into a plurality of smoothing capacitors provided in the first power circuit 2 and the load circuit 4, for example.

The second power circuit 3 includes the second battery B2, second power lines 31$p$ and 31$n$ respectively coupling to each other both positive and negative electrodes of the second battery B2 and a positive electrode terminal and a negative electrode terminal on a low voltage side of the voltage converter 5, a positive electrode contactor 32$p$ and a negative electrode contactor 32$n$ respectively provided to the second power lines 31$p$ and 31$n$, and a current, sensor 33 provided to the second power line 31$p$.

The contactors 32$p$ and 32$n$ are a normally open type, i.e., which are each opened when no external command signals are inputted to disconnect from each other both the electrodes of the second battery B2 and the second power lines 31$p$ and 31$n$. The contactors 32$p$ and 32$n$ are each closed when command signals are inputted to couple to each other the second battery B2 and the second power lines 31$p$ and 31$n$. The contactors 32$p$ and 32$n$ open or close in response to command signals transmitted from the second battery ECU 75. Note that the positive electrode contactor 32$p$ is a pre-charge contactor including a pre-charge resistor used to mitigate a rush current flowing into a plurality of smoothing capacitors provided in the first power circuit 2 and the load circuit 4, for example.

The current sensor 33 transmits to the converter ECU 73 a detection signal corresponding to a passing current that is a current flowing in the second power line 31$p$, i.e., a current flowing in the voltage converter 5. Note that, in the present embodiment, as for directions or a passing current, one direction is regarded as positive when the passing current flows from the second power circuit 3 to the first power circuit 2. Another direction is regarded as negative when the passing current flows from the first power circuit 2 to the second power circuit 3.

The load circuit 4 includes vehicle auxiliary devices 42, a power converter 43 coupled to the drive motor M, and load power lines 41$p$ and 41$n$ respectively coupling to each other the vehicle auxiliary devices 42, the power converter 43, and the first power circuit 2.

The vehicle auxiliary devices 42 include a plurality of electrical loads such as a battery heater, an air compressor, a direct current-direct current (DC-DC) converter, and an in-vehicle charger. The vehicle auxiliary devices 42 are coupled, via the load power lines 41$p$ and 41$n$, to the first power lines 21$p$ and 21$n$ of the first power circuit 2 to consume power supplied through the first power lines 21$p$ and 21$n$ for operation. Information regarding operational states of the various electrical loads constituting the vehicle auxiliary devices 42 is transmitted to the management ECU 71, for example.

The power converter 43 is coupled, via the load power lines 41$p$ and 41$n$, to the first power lines 21$p$ and 21$n$, and is thus parallel to the vehicle auxiliary devices 42. The power converter 43 converts power between the first power lines 21$p$ and 21$n$ and the drive motor M. The power converter 43 is, for example, a pulse width modulation (PWM) inverter that operates based on pulse width modulation. The PWM inverter includes a bridge circuit where a plurality of switching devices (for example, insulated gate bipolar transistors (IGBTs)) are coupled to each other through bridge connections. The power converter 43 has a function of performing conversion between direct current power and alternating current power. The power converter 43 is coupled to the first power lines 21$p$ and 21$n$ on its direct current, input-and-output side. On its alternating current, input-and-output side, the power converter 43 is further coupled to coils of a U phase, a V phase, and a W phase of the drive motor M. The power converter 43 follows gate drive signals generated at predetermined timings from a non-illustrated gate drive circuit of the motor ECU 72, on-and-off-drives the switching devices for the phases, converts direct current power in the first power lines 21$p$ and 21$n$ into three phase, alternating current power, and supplies the power to the drive motor M, and converts three phase, alternating current power supplied from the drive motor M into direct current power, and supplies the power to the first power lines 21$p$ and 21$n$.

The voltage converter 5 couples to each other the first power circuit 2 and the second power circuit 3 and converts a voltage between both the circuits 2 and 3. A known voltage-booster circuit is used to serve as the voltage converter 5.

Figure 2:
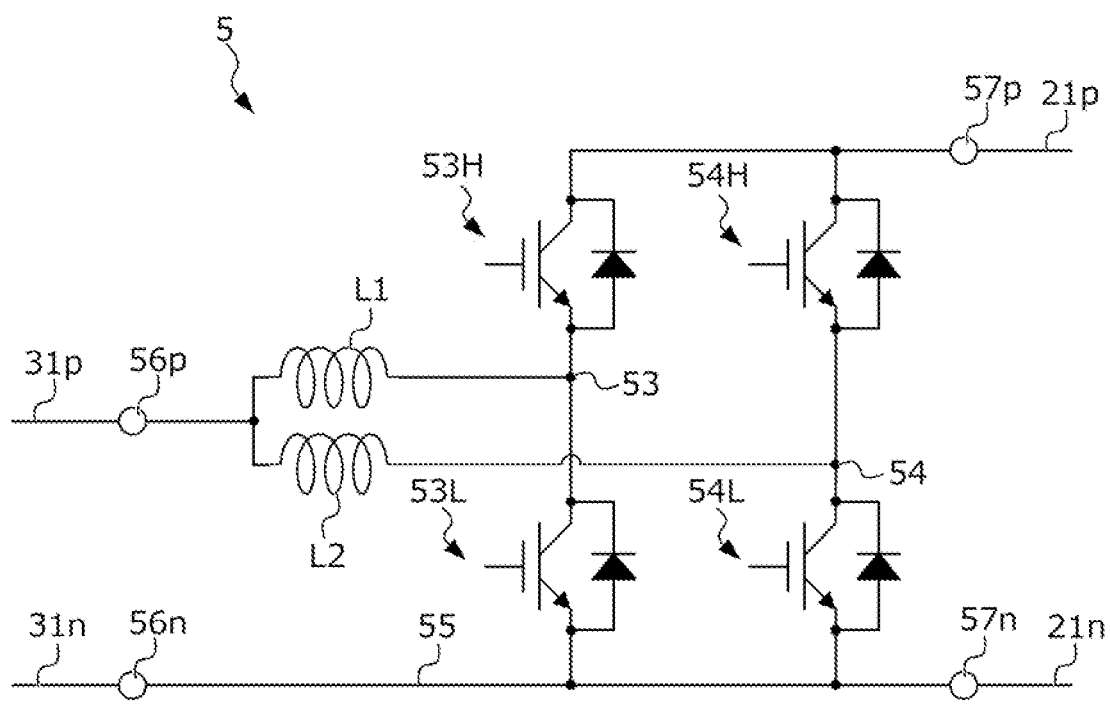
FIG. 2 is a view illustrating an example of a circuit configuration of a voltage converter.

FIG. 2 is a view illustrating an example of a circuit configuration of the voltage converter 5. The voltage converter 5 couples to each other the first power lines 21$p$ and 21$n$ coupled to the first battery B1 and the second power lines 31$p$ and 31$n$ coupled to the second battery B2 and converts a voltage between the first power lines 21$p$ and 21$n$ and the second power lines 31p and 31n. The voltage converter 5 is a full bridge type DC-DC converter configured to combine with each other a first reactor L1, a second reactor L2, a first high arm element 53H, a first low arm element 53L, a second high arm element 54H, a second low arm element 54L, a negative bus line 55, low voltage side terminals 56p and 56n, high voltage side terminals 57p and 57n, and a non-illustrated smoothing capacitor.

The low voltage side terminals 56p and 56n are respectively coupled to the second power lines 31p and 31n. The high voltage side terminals 57p and 57n are respectively coupled to the first power lines 21p and 21n. The negative bus line 55 is a wire coupling to each other the low voltage side terminal 56n and the high voltage side terminal 57n.

The first reactor L1 has an end side coupled to the low voltage side terminal 56p and another end side coupled to a coupling node 53 between the first high arm element 53H and the first low arm element 53L. The first high arm element 53H and the first low arm element 53L each include a known power switching device such as an IGBT or a metal-oxide semiconductor field-effect transistor (MOSFET) and a freewheeling diode coupled to the power switching device. The high arm element 53H and the low am element 53L are coupled in series and in this order between the high voltage side terminal 57p and the negative bus line 55.

The power switching device of the first high arm element 53H has a collector coupled to the high voltage side terminal 57p and an emitter coupled to a collector of the first low arm element 53L. An emitter of the power switching device of the first low arm element 53L is coupled to the negative bus line 55. A forward direction in the freewheeling diode provided to the first high arm element 53H is a direction from the first reactor L1 to the high voltage side terminal 57p. A forward direction in the freewheeling diode provided to the first low arm element 53L is a direction from the negative bus line 55 to the first reactor L1.

The second reactor L2 has an end side coupled to the low voltage side terminal 56p and another end side coupled to a coupling node 54 between the second high arm element 54H and the second low arm element 54L. The second high arm element 54H and the second low arm element 54L each include a known power switching device such as an IGBT or a MOSFET and a freewheeling diode coupled to the power switching device. The high arm element 54H and the low am element 54L are coupled in series and in this order between the high voltage side terminal 57p and the negative bus line 55.

The power switching device of the second high arm element 54H has a collector coupled to the high voltage side terminal 57p and an emitter coupled to a collector of the second low arm element 54L. An emitter of the power switching device of the second low arm element 54L is coupled to the negative bus line 55. A forward direction in the freewheeling diode provided to the second high arm element 54H is a direction from the second reactor L2 to the high voltage side terminal 57p. A forward direction in the freewheeling diode provided to the second low arm element 54L is a direction from the negative bus line 55 to the second reactor L2.

The voltage converter 5 follows gate drive signals generated at predetermined timings from a non-illustrated gate drive circuit of the converter ECU 73, alternately turns on/off and drives the first high arm element 53H and the second low arm element 54L and the first low arm element 53L and the second high arm element 54H, and converts a voltage between the first power lines 21p and 21n and the second power lines 31p and 31n.

A static voltage of the second battery B2 is basically maintained lower than a static voltage of the first battery B1. Therefore, a voltage in the first power lines 21p and 21n is basically higher than a voltage in the second power lines 31p and 31n. Therefore, the converter ECU 73 operates, when power outputted from the first battery B1 and power outputted from the second battery B2 are both used to drive the drive motor M, the voltage converter 5 to allow the voltage converter 5 to exert a voltage-boosting function. The voltage-boosting function refers to a function of voltage-boosting power in the second power lines 31p and 31n respectively coupled to the low voltage side terminals 56p and 56n to output the voltage-boosted power to the first power lines 21p and 21n respectively coupled to the high voltage side terminals 57p and 57n. Therefore, a positive passing current flows from the second power lines 31p and 31n to the first power lines 21p and 21n. When discharging of the second battery B2 is suppressed, but power outputted from the first battery B1 is only used to drive the drive motor M, the converter ECU 73 turns off the voltage converter 5 to prevent a current from flowing from the first power lines 21p and 21n to the second power lines 31p and 31n.

When regenerative power outputted from the drive motor M to the first power lines 21p and 21n during deceleration is used to charge the first battery B1 and the second battery B2, the converter ECU 73 operates the voltage converter 5 to allow the voltage converter 5 to exert a voltage-lowering function. The voltage-lowering function refers to a function of voltage-lowering power in the first power lines 21p and 21n respectively coupled to the high voltage side terminals 57p and 57n to output the voltage-lowered power to the second power lines 31p and 31n respectively coupled to the low voltage side terminals 56p and 56n. Therefore, a negative passing current flows from the first power lines 21p and 21n to the second power lines 31p and 31n.

Now back to FIG. 1. The first battery ECU 74 is one of the computers, which mainly performs state monitoring of the first battery B1 and open-and-close operations for the contactors 22p and 21n of the first power circuit 2. The first battery ECU 74 uses a known algorithm and detected values transmitted from the first battery sensor unit 81 to calculate various parameters representing an internal state of the first battery B1, more specifically, a temperature of the first battery B1, internal resistance of the first battery B1, a static voltage of the first battery B1, a short-circuit voltage of the first battery B1, a first maximum output, corresponding to power that the first battery B1 is able to output, and a first SOC corresponding to a percentage of charge in the first battery B1, for example. As described above, in the present embodiment, the first, battery sensor unit 81 and the first battery ECU 74 therefore achieve a first remaining-amount parameter acquisition device and a first maximum output acquisition device. Information regarding the parameters that the first battery ECU 74 has acquired to represent the internal state of the first battery B1 is transmitted to the management ECU 71, for example.

The second battery ECU 75 is one of the computers, which mainly performs state monitoring of the second battery B2 and open-and-close operations for the contactors 32p and 32n of the second power circuit 3. The second battery ECU 75 uses a known algorithm and detected values transmitted from the second battery sensor unit 82 to calculate various parameters representing an internal state of the second battery B2, more specifically, a temperature of the second battery B2, internal resistance of the second battery B2, a static voltage of the second battery B2, a short-circuit voltage of the second battery B2, a second maximum output corresponding to power that the second battery B2 is able to output, and a second SOC corresponding to a percentage of charge in the second battery B2, for example. As described above, in the present embodiment, the second battery sensor unit 62 and the second battery ECU 75 therefore achieve a second remaining-amount parameter acquisition device and a second maximum output acquisition device. Information regarding the parameters that the second battery ECU 75 has acquired to represent the internal state of the second battery B2 is transmitted to the management ECU 71, for example.

The management ECU 71 is one of the computers, which mainly manages a flow of power in the whole power supply system 1. The management ECU 71 executes power management processing, described later with reference to FIG. 4, to generate a torque command signal corresponding to a command regarding torque that the drive motor M generates and a converter passing power command signal corresponding to a command regarding converter passing power that is power passing through the voltage converter 5.

The management ECU 71 is coupled to a charging request lamp 91, a monitor 92, and a remaining travel distance meter 93. The charging request lamp 91, the monitor 92, and the remaining travel distance meter 93 are respectively provided at positions at which the driver is able to see.

The charging request lamp 91 is a notification device prompting the driver to charge the first battery B1. The management ECU 71 causes, when the first SOC is more than a predetermined lamp-on threshold (for example, see FIG. 6, described later), the charging request lamp 91 to go off. The management ECU 71 causes, when the first SOC is equal to or less than the lamp-on threshold, the charging request lamp 91 to come on. The illumination prompts the driver to charge the first battery B1. Note that, since the first SOC and the first maximum output have an approximately proportional relationship, the management ECU 71 may compare with each other the first maximum output and a predetermined threshold to cause the charging request lamp 91 to go off or come on.

The remaining travel distance meter 93 is a notification device that notifies, to the driver, a remaining traveling possible distance that is a distance with which the vehicle is able to travel. The management ECU 71 uses a known algorithm and the first SOC, the second SOC, the first maximum output, and the second maximum output to calculate the remaining traveling possible distance. The management ECU 71 then causes the remaining travel distance meter 93 to display a numerical value of the calculated remaining traveling possible distance. Here, the management ECU 71 sets, when a maximum system output that is a sum of the first maximum output and the second maximum output is less than a predetermined output threshold (for example, see FIG. 6, described later), the remaining traveling possible distance to 0.

The monitor 92 is an information display device that displays, in the form of text or a pictorial figure, for example, warning information regarding a state of the power supply system 1 to notify, to the driver, the state of the power supply system 1. Note that the content of the warning information and a timing of displaying the warning information on the monitor 92 will be described later with reference to FIG. 4.

The motor ECU 72 is one of the computers, which mainly operates the power converter 43 to control a flow of power between the first power circuit 2 and the drive motor M, i.e., a flow of inverter passing power that is power passing through the power converter 43. Note that the inverter passing power that will be described below is regarded as positive when the power flows from the first power circuit 2 to the drive motor M, i.e., when the drive motor M is in power-driving. The inverter passing power is regarded as negative when power flows from the drive motor M to the first power circuit 2, i.e., when the drive motor M is in regenerative-driving. The motor ECU 72 follows a torque command signal calculated based on a command regarding the inverter passing power in the management ECU 71, operates the power converter 43, and causes the drive motor M to generate torque according to the command.

The converter ECU 73 is one of the computers, which mainly operates the voltage converter 5 to control a flow of power between the first power circuit 2 and the second power circuit 3, i.e., a flow of converter passing power that is power passing through the voltage converter 5. Note that the converter passing power that will be described below is regarded as positive when the power flows from the second power circuit 3 to the first power circuit 2, i.e., when the second battery B2 discharges and supplies power to the first power circuit 2. The converter passing power is regarded as negative when the power flows from the first power circuit 2 to the second power circuit 3, i.e., when the second battery B2 is charged with power in the first power circuit 2. The converter ECU 73 follows a converter passing power command signal transmitted from the management ECU 71, operates the voltage converter 5, and allows converter passing power according to the command to pass through the voltage converter 5. More specifically, the converter ECU 73 uses the converter passing power command signal, calculates a target current that is a target to a passing current in the voltage converter 5, follows a known feedback control algorithm, operates the voltage converter 5, and allows a passing current (hereinafter also referred to as an "actual passing current") that the current sensor 33 detects to reach the target current.

Figure 3:
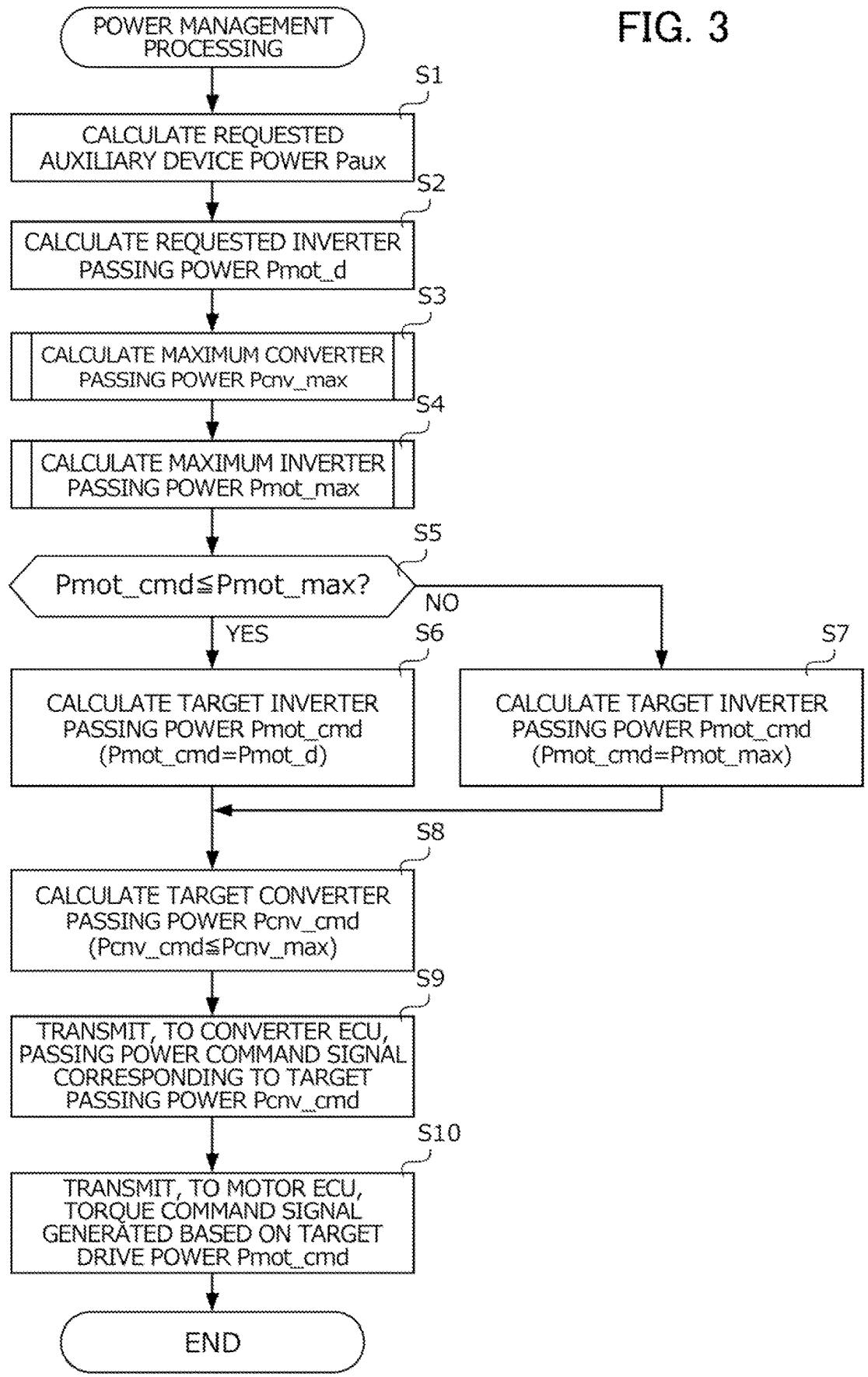
FIG. 3 is a flowchart illustrating a specific procedure of power management processing.

FIG. 3 is a flowchart illustrating a specific procedure of the power management processing. The power management processing is repeatedly executed at predetermined cycles in the management ECU 71 until the remaining traveling possible distance reaches 0, i.e., the maximum system output is equal to or less than the output threshold.

At S1, the management ECU 71 first calculates requested auxiliary device power Paux that is power requested from the vehicle auxiliary devices 42. The management ECU 71 then proceeds to S2. The management ECU 71 calculates the requested auxiliary device power Paux based on information regarding operational states of the various electrical loads, which is transmitted from the vehicle auxiliary devices 42.

At S2, the management ECU 71 calculates requested inverter passing power Pmot_d according to a request for inverter passing power in the power converter 43. The management ECU 71 then proceeds to S3, The management ECU 71 calculates requested drive torque of the driver based on amounts of operations, by the driver, of pedals P (see FIG. 1) such as an accelerator pedal and a brake pedal, converts the requested drive torque into power, and calculates the requested inverter passing power Pmot_d.

At S3, the management ECU 71 calculates maximum converter passing power Pcnv_max corresponding to maximum power with respect to the converter passing power in the voltage converter 5. The management ECU 71 then proceeds to S4. Note that a specific procedure of calculating the maximum converter passing power Pcnv_max will foe described later in detail with reference to FIG. 4.

At S4, the management ECU 71 calculates maximum inverter passing power Pmot_max corresponding to maximum power with respect to inverter passing power in the power converter 43. The management ECU 71 then proceeds to S5. Note that a specific procedure of calculating the maximum inverter passing power Pmot_max will be described later in detail with reference to FIG. 5.

At S3, the management ECU 71 determines whether the requested inverter passing power Pmot_d is equal to or less than the maximum inverter passing power Pmot_max.

When a result of determination at S5 is YES (when Pmot_d≤Pmot_max), the management ECU 71 sets the requested inverter passing power Pmot_d calculated at S2 as target inverter passing power Pmot_cmd corresponding to a target to the inverter passing power in the power converter 43 (see S6). The management ECU 71 then proceeds to S8.

When a result of determination at S5 is NO (when Pmot_d>Pmot_max), the management ECU 71 sets the maximum inverter passing power Pmot_max calculated through the process of S4 as the target inverter passing power Pmot_cmd (see S7). The management ECU 71 then proceeds to S8.

At S8 the management ECU 71 calculates target converter-passing power Pcnv_cmd corresponding to a target for the converter passing power in the voltage converter 5. The management ECU 71 then proceeds to S9. More specifically, the management ECU 71 calculates the target converter passing power Pcnv_cmd to perform charging and discharging of the first battery B1 and the second battery B2 at a predetermined rate within a range at and less than the maximum converter passing power Pcnv_max.

Note that, when the maximum converter passing power Pcnv_max is made smaller than the second maximum output of the second battery B2 to restrict discharging of the second battery B2 at a value smaller than the second maximum output (see S27 in FIG. 4, described later), and the second SOC is less than a predetermined target second SOC, the management ECU 71 preferably and proactively sets the target converter passing power Pcnv_cmd to a value smaller than 0, and preferably and proactively charges the second battery B2 with power in the first power circuit 2.

At S9, the management ECU 71 generates a converter passing power command signal corresponding to the target converter passing power Pcnv_cmd calculated at S8, and transmits the signal to the converter ECU 73. The management ECU 71 then proceeds to S10. Therefore, the second battery B2 undergoes charging and discharging with power corresponding to the target converter passing power Pcnv_cmd.

At S10, the management ECU 71 generates a torque command signal based on the target inverter passing power Pmot_cmd calculated at S6 or S7, and transmits the signal to the motor ECU 72. The management ECU 71 then ends the power management processing. More specifically, the management ECU 71 converts the target inverter passing power Pmot_cmd into torque to calculate target drive torque, and generates a torque command signal corresponding to the target drive torque. The motor ECU 72 operates the power converter 43 based on the torque command signal. Therefore, power corresponding to the target inverter passing power Pmot_cmd flows between the first power circuit 2 and the drive motor M.

Figure 4:
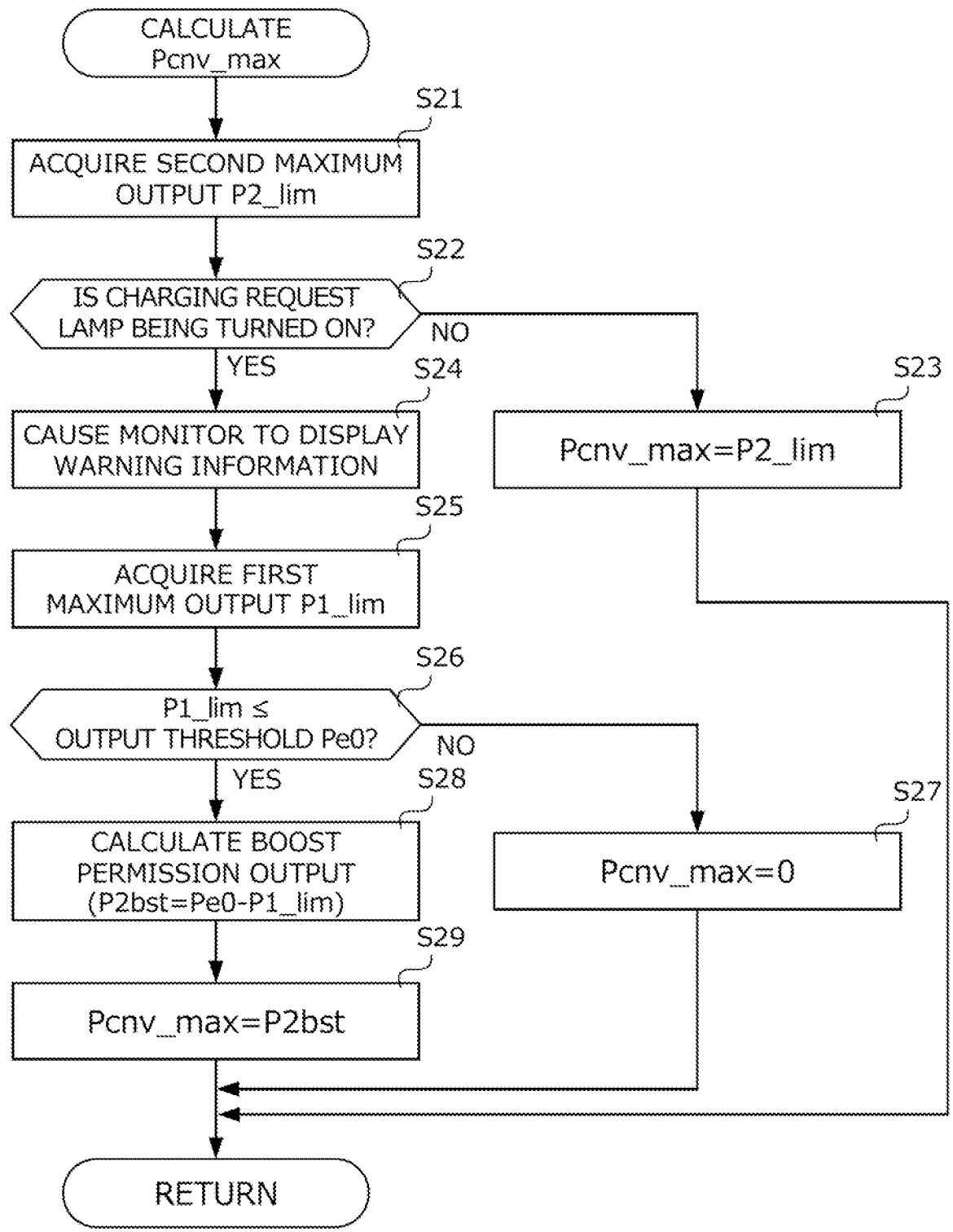
FIG. 4 is a flowchart illustrating a procedure of calculating maximum converter passing power.

FIG. 4 is a flowchart illustrating a procedure of calculating the maximum converter passing power Pcnv_max.

At S21, the management ECU 71 acquires a second maximum output P2_lim. The management ECU 71 then proceeds to S22. At S22, the management ECU 71 determines whether the charging request lamp 91 is turned on, i.e., whether the first SOC is equal to or less than the lamp-on threshold.

When a result of determination at S22 is NO, i.e., when the first SOC is more than the lamp-on threshold, the management ECU 71 proceeds to S23 and sets the second maximum output P2_lim as the maximum converter passing power Pcnv_max. The management ECU 71 then moves to the process of S4 in FIG. 3.

When a result of determination at S22 is YES, i.e., when the first SOC is equal to or less than the lamp-on threshold, the management ECU 71 then proceeds to S24.

At S24, the management ECU 71 causes the monitor 92 to display predetermined warning information. The management ECU 71 then proceeds to S25. As will be described below, when the first SOC is equal to or less than the lamp-on threshold, an output of the second battery B2 is restricted. In this case, it is impossible to fulfill a request of the driver, resulting in the driver possibly feeling uncomfortable. At S24, the management ECU 71 then causes the monitor 92 to display a message regarding a state where output power to the drive motor M is presently restricted and a message prompting prompt charging of the first battery B1.

At S25, the management ECU 71 acquires a first maximum output P1_lim. The management ECU 71 then proceeds to S26. At S26, the management ECU 71 determines whether the first maximum output P1_lim is equal to or less than an output threshold Pe0.

When a result of determination at S26 is NO, i.e., when the first SOC is equal to or less than the lamp-on threshold and the first maximum output P1_lim is more than the output threshold Pe0, the management ECU 71 then proceeds to S27. At S27, the management ECU 71 sets the maximum converter passing power Pcnv_max to 0, i.e., prohibits discharging of the second battery B2. The management ECU 71 then moves to the process of S4 in FIG. 3.

When a result of determination at S26 is YES, i.e., when the first SOC is equal to or less than the lamp-on threshold and the first maximum output P1_lim is equal to or less than the output threshold Pe0, the management ECU 71 then proceeds to S28. At S28, the management ECU 71 calculates a boost permission output P2bst of the second battery B2. The management ECU 71 then proceeds to S29. More specifically, the management ECU 71 subtracts the first maximum output P1_lim from the output threshold Pe0 to calculate the boost permission output P2bst (P2bst=Pe0−P1_lim). That is, a difference between the output threshold Pe0 and the first maximum output P1_lim is regarded as the boost permission output P2bst.

At S29, the management ECU 71 sets the boost permission output P2bst as the maximum converter passing power Pcnv_max. The management ECU 71 then moves to the process of S4 in FIG. 3. That is, when the first SOC is equal to or less than the lamp-on threshold and the first maximum output P1_lim is equal to or less than the output threshold Pe0, the management ECU 71 sets the maximum converter passing power Pcnv_max to a value greater than 0 and permits discharging of the second battery B2. That is, when the first SOC is equal to or less than the lamp-on threshold and the first maximum output P1_lim is equal to or less than the output threshold Pe0, the management ECU 71 sets the maximum converter passing power Pcnv_max to a larger value and permits discharging of the second battery B2, compared with a case where the first SOC is equal to or less than the lamp-on threshold and the first maximum output P1_lim is more than the output threshold Pe0.

Figure 5:
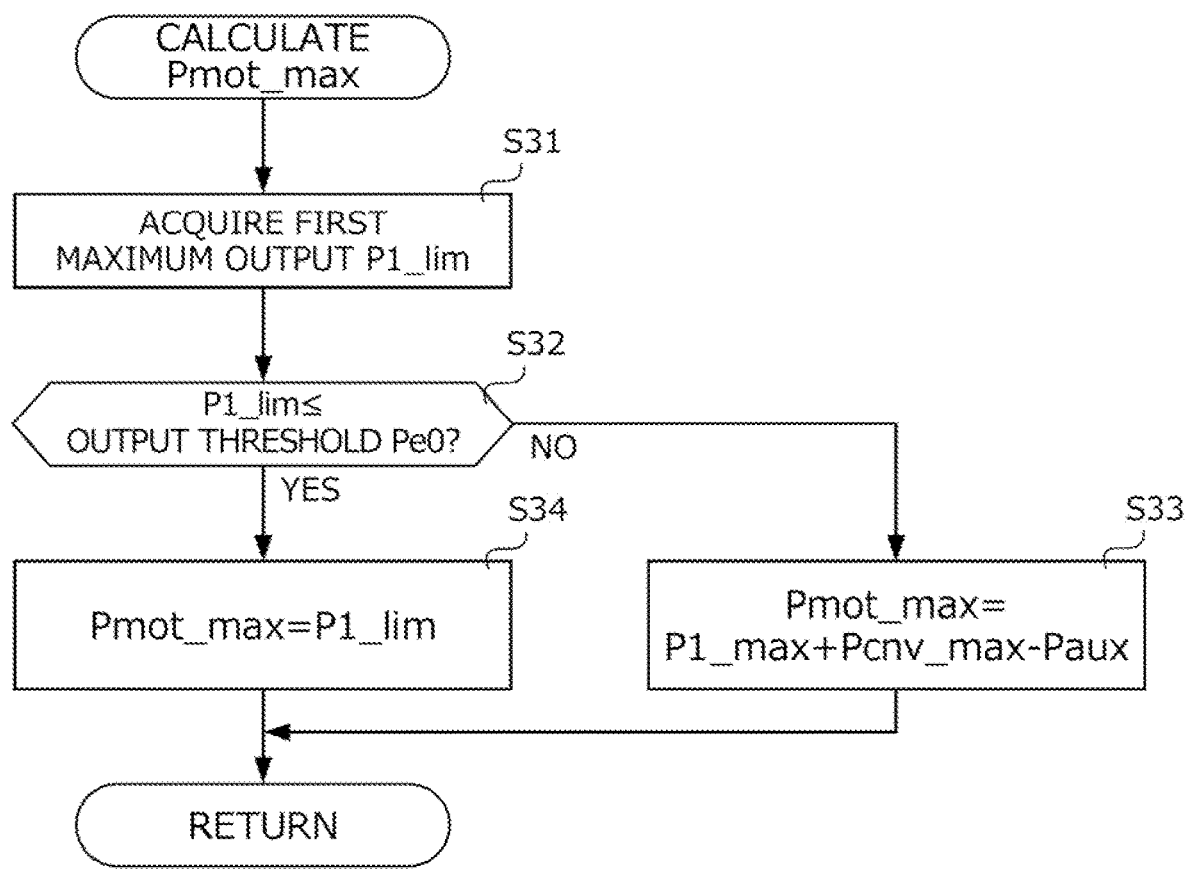
FIG. 5 is a flowchart illustrating a procedure of calculating maximum inverter passing power.

FIG. 5 is a flowchart illustrating a procedure of calculating the maximum Inverter passing power Pmot_max.

At S31, the management ECU 71 first acquires the first maximum output P1_lim. The management ECU 71 then proceeds to S32. At S32, the management ECU 71 determines whether the first maximum output P1_lim is equal to or less than the output threshold Pe0.

When a result of determination at S32 is NO, i.e., when the first maximum output P1_lim is more than the output threshold Pe0, the management ECU 71 then proceeds to S33. The management ECU 71 subtracts the requested auxiliary device power Paux acquired at S1 in FIG. 3 from a sum of the first maximum output P1_lim acquired at S31 and the maximum converter passing power Pcnv_max calculated through the processing in FIG. 4 to calculate the maximum inverter passing power Pmot_max (Pmot_max=P1_lim+Pcnv_max−Paux). The management ECU 71 then moves to the process of S5 in FIG. 3.

When a result of determination at S32 is YES, i.e., when the first maximum output P1_lim is equal to or less than the output threshold Pe0, the management ECU 71 then proceeds to S34 to set the first maximum output P1_lim acquired at S31 as the maximum inverter passing power Pmot_max (Pmot_max=P1_lim). The management ECU 71 then moves to the process of S5 in FIG. 3.

Figure 6:
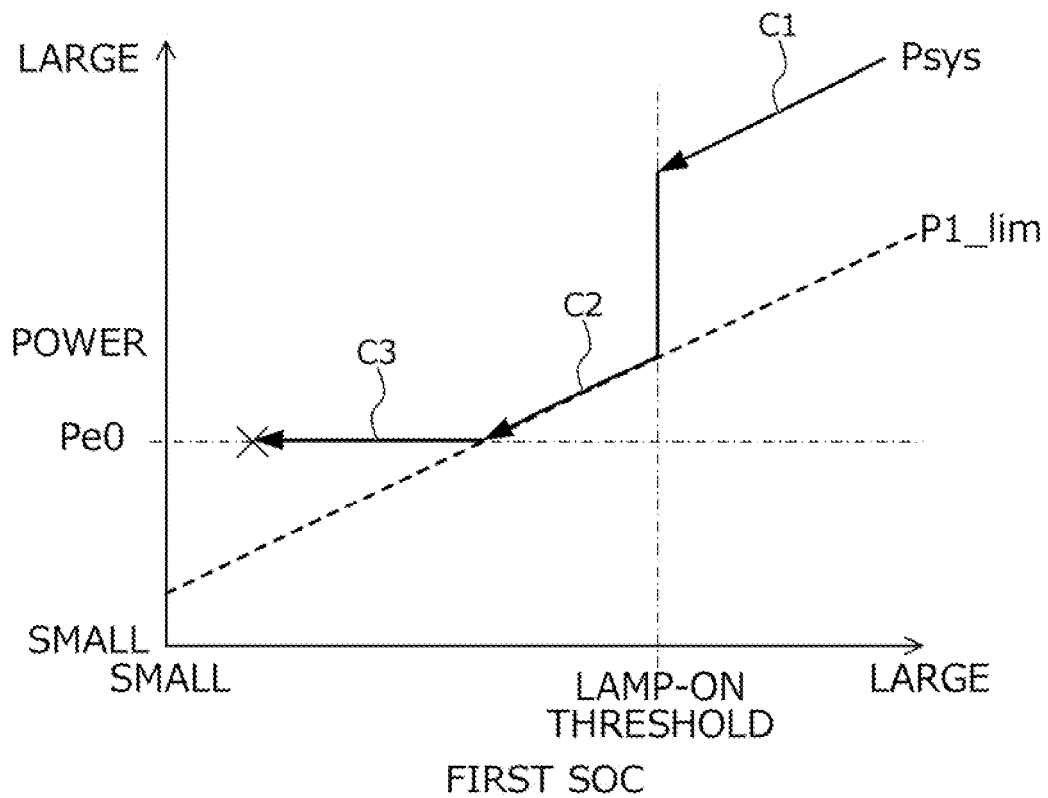
FIG. 6 is a view illustrating changes in a first maximum output and a system output when a first SOC drops to a value around a lamp-on threshold.

FIG. 6 is a view illustrating changes in the first maximum output P1_lim (dotted line) and a system output Psys (solid line) when the first SOC drops to a value around the lamp-on threshold. In here, the system output Psys is a sum of power outputted from the first battery B1 and power outputted from the second battery B2. Note that the example in FIG. 6 illustrates, for ease of understanding, a case where the requested auxiliary device power Paux is set to 0 and the requested inverter passing power Pmot_d is always regarded as a maximum value.

When the first SOC is more than the lamp-on threshold, power is brought from the first battery B1 and the second battery B2, causing both the first SOC and the first maximum output P1_lim to drop. Therefore, the system output Psys gradually drops along a route C1, as the first maximum output P1_lim drops.

In here, when the first SOC is equal to or less than the lamp-on threshold and the first maximum output P1_lim of the first battery B1 is more than the output threshold Pe0, the management ECU 71 sets the maximum converter passing power Pcnv_max to 0 to prohibit discharging of the second battery B2 (see S22, S24, S5, S26, and S27 in FIG. 4). Therefore, the system output Psys follows a route C2 to drop to the first maximum output P1_lim. Note that, at this time, while discharging of the second battery B2 is prohibited and the second SOC is less than the target second SOC, the second battery B2 is proactively charged with power in the first power circuit 2 (see S3 in FIG. 3).

After that, when the first maximum output P1_lim of the first battery B1 drops to the output threshold Pe0, the management ECU 71 sets the first maximum output P1_lim as the maximum inverter passing power Pmot_max to restrict power supplied from the first power circuit 2 to the drive motor M to a value equal to or smaller than the first maximum output P1_lim (see S32 and S34 in FIG. 5). When the first maximum output P1_lim drops to the output threshold Pe0, the management ECU 71 permits discharging of the second battery B2 to complement a shortage of power supplied from the first battery B1 (see S26, S28, and S29 in FIG. 4). Therefore, the system output Psys follows a route C3 on the output threshold Pe0. After that, when the first maximum output P1_lim drops and the maximum system output that is a sum of the first maximum output P1_lim and the second maximum output P2_lim drops to a value smaller than the output threshold Pe0, the remaining traveling possible distance reaches 0. Therefore, until the remaining traveling possible distance reaches 0, it is possible to fully use power stored in the first battery B1.

The power supply system 1 and the vehicle V according to the present embodiment lead to the following effects. (1) In the power supply system 1, the first power circuit 2 coupled to the capacity-type first battery B1 and the load circuit 4 and the second power circuit 3 coupled to the output-type second battery B2 are coupled to each other via the voltage converter 5. The converter ECU 73 operates the voltage converter 5 to control the converter passing power, i.e., to control charging and discharging of the second battery B2. In here, the second maximum output P2_lim of the output-type second battery B2 drops faster than the first maximum output P1_lim of the capacity-type first battery B1. Therefore, when, for example, the first SOC is less than the lamp-on threshold, the first maximum output P1_lim is more than the output threshold Pe0, and discharging of the second battery B2 is permitted, the maximum system output that is a sum of the first maximum output P1_lim and the second maximum output P2_lim may drop below the output threshold Pe0 before power stored in the first battery B1 is fully used. In the power supply system 1, the management ECU 71 then prohibits, when the first SOC of the first battery B1 is less than the lamp-on threshold and the first maximum output P1_lim is more than the output threshold Pe0, discharging of the second battery B2. Therefore, until the first maximum output P1_lim of the first battery B1 drops below the output threshold Pe0, it is possible to secure auxiliary power in the second battery B2. Therefore, with the power supply system 1, it is possible to use power from the second battery B2 to supply necessary power to the load circuit 4 after the first maximum output P1_lim has dropped below the output threshold Pe0, making it possible to fully use power stored in the first battery B1.

(2) In the power supply system 1, the management ECU 71 permits, when the first SOC is less than the lamp-on threshold and the first maximum output P1_lim is less than the output threshold Pe0, discharging of the second battery B2. Therefore, when the first maximum output P1_lim is less than the output threshold Pe0, it is possible to complement insufficient power (the output threshold Pe0—the first maximum output P1_lim) with power secured from the second battery B2 while the first maximum output P1_lim is more than the output threshold Pe0, as described above, making it possible to prevent a whole system output of the system including the first battery B1 and the second battery B2 from dropping below the output threshold Pe0, and to fully use power stored in the first battery B1.

(3) In the power supply system 1, the management ECU 71 restricts, when the first SOC is less than the lamp-on threshold and the first maximum output P1_lim is less than the output threshold Pe0, power supplied from the first power circuit 2 to the load circuit 4 to a value equal to or smaller than the output threshold Pe0. Therefore, it is possible to restrict an output from the second battery B2, making it possible to fully use power stored in the first battery B1.

(4) In the power supply system 1, the management ECU 71 prohibits discharging of the second battery B2 and, when the second SOC is less than the target second SOC, uses power in the first power circuit 2 to charge the second battery B2. Therefore, it is possible to increase a remaining amount of the second battery B2 for preparing a case where the first maximum output P1_lim of the first battery B1 drops below the output threshold Pe0. Therefore, with the power supply system 1, it is possible to secure a longer period during which it is possible to complement power from the second battery B2 after the first maximum output P1_lim has dropped below the output threshold Pe0, making it possible to fully use power stored in the first battery B1.

(5) With the vehicle V mounted with the power supply system 1, it is possible to keep traveling with the drive motor M until power stored in the first battery B1 is fully used.

(6) In the vehicle V, when the first SOC is less than the lamp-on threshold and the first maximum output P1_lim is more than the output threshold Pe0, discharging of the second battery B2 is prohibited. Therefore, in the vehicle V, it is impossible to supply power according to a request of the driver to the drive motor M, resulting in the driver possibly feeling uncomfortable. The management ECU 71 then causes, when the first SOC is less than the lamp-on threshold, the monitor 92 to display warning information regarding a state of the power supply system 1. Therefore, it is possible to suppress uncomfortable feelings in the driver.

(7) In the vehicle V, the management ECU 71 causes the monitor 92 to display a message regarding a state where output power to the drive motor M is presently restricted and a message prompting prompt charging of the first battery B1. With the vehicle V, it is possible to suppress uncomfortable feelings in the driver when outputting of power to the drive motor M is restricted, but to prompt charging of the first battery B1.

Although the embodiment of the present invention has been described, the present invention is not limited to the embodiment. The present invention may be appropriately altered in detailed configuration within the scope of the present invention.

For example, the embodiment has been described above with reference to the case where, when the first SOC is equal to or less than the lamp-on threshold and the first maximum output P1_lim is more than the output threshold Pe0, the maximum converter passing power Pcnv_max is set to 0 to prohibit discharging of the second battery B2 (see S27 in FIG. 4). However, the present invention is not limited to the case. When the first SOC is equal to or less than the lamp-on threshold and the first maximum output P1_lim is more than the output threshold Pe0, the maximum converter passing power Pcnv_max may be set to a value smaller than the second maximum output P2_lim to restrict discharging of the second battery B2 to a value smaller than the second maximum output P2_lim.

What is claimed is:

1. A power supply system comprising:
a first power circuit coupled to a first electric storage device and an electrical load;
a second power circuit coupled to a second electric storage device having higher output density and lower energy density than output density and energy density of the first electric storage device;
a first remaining-amount parameter acquisition device that acquires a first remaining-amount parameter that increases or decreases in accordance with a remaining amount of the first electric storage device;
a first maximum output acquisition device that acquires a first maximum output that is a maximum output of the first electric storage device;
a voltage converter that converts a voltage between the first power circuit and the second power circuit; and
a control device that operates the voltage converter to control a flow of power between the first power circuit and the second power circuit,
the control device prohibits, when the first remaining-amount parameter is less than a remaining amount threshold and the first maximum output is more than an output threshold as a fixed value, discharging of the second electric storage device until the first maximum output is equal to or less n the output threshold.

2. A power supply system comprising,
a first power circuit coupled to a first electric storage device and an electrical load:
a second power circuit coupled to a second electric storage device having higher output density and lower energy density than output density and energy density of the first electric storage device:
a first remaining-amount parameter acquisition device that acquires a first remaining-amount parameter that increases or decreases in accordance with a remaining amount of the first electric storage device;
a first maximum output acquisition device that acquires a first maximum output that is a maximum output of the first electric storage device;
a voltage converter that converts a voltage between the first power circuit and the second power circuit; and
a control device that operates the voltage converter to control a flow of power between the first power circuit and the second power circuit,
the control device restricts, when the first remaining-amount parameter is less than a remaining amount threshold and the first maximum output is more than an output threshold, discharging of the second electric storage device, compared with a case where the first remaining-amount parameter is more than the remaining amount threshold,
wherein the control device permits, when the first remaining-amount parameter is less than the remaining amount threshold and the first maximum output is less than the output threshold, discharging of the second electric storage device, compared with a case where the first remaining-amount parameter is less than the remaining amount threshold and the first maximum output is more than the output threshold.

3. The power supply system according to claim 2, wherein the control device sets, when the first remaining-amount parameter is less than the remaining amount threshold and the first maximum output is less than the output threshold, a difference between the output threshold and the first maximum output as maximum power passing from a side adjacent to the second power circuit to a side adjacent to the first power circuit in the voltage converter.

4. A power supply system comprising:
a first power circuit coupled to a first electric storage device and an electrical load;
a second power circuit coupled to a second electric storage device having higher output density and lower energy density than output density and energy density of the first electric storage device;
a first remaining-amount parameter acquisition device that acquires a first remaining-amount parameter that increases or decreases in accordance with a remaining amount of the first electric storage device;
a second remaining-amount parameter acquisition device that acquires a second remaining-amount parameter that increases or decreases in accordance with a remaining amount of the second electric storage device;

a first maximum output acquisition device that acquires a first maximum output that is a maximum output of the first electric storage device;

a voltage converter that converts a voltage between the first power circuit and the second power circuit; and a control device that operates the voltage converter to control a flow of power between the first power circuit and the second power circuit, the control device restricts, when the first remaining-amount parameter is less than a remaining amount threshold and the first maximum output is more than an output threshold, discharging of the second electric storage device, compared with a case where the first remaining-amount parameter is more than the remaining amount threshold, wherein the control device uses, when the first remaining-amount parameter is less than the remaining amount threshold, the first maximum output is more than the output threshold, and the second remaining-amount parameter is less than a target remaining amount, power in the first power circuit to charge the second electric storage device.

5. The power supply system according to claim 1, further comprising a second remaining-amount parameter acquisition device that acquires a second remaining-amount parameter that increases or decreases in accordance with a remaining amount of the second electric storage device, wherein the control device uses, when the first remaining-amount parameter is less than the remaining amount threshold, the first maximum output is more than the output threshold, and the second remaining-amount parameter is less than a target remaining amount, power in the first power circuit to charge the second electric storage device.

6. The power supply system according to claim 2, further comprising a second remaining-amount parameter acquisition device that acquires a second remaining-amount parameter that increases or decreases in accordance with a remaining amount of the second electric storage device, wherein the control device uses, when the first remaining-amount parameter is less than the remaining amount threshold, the first maximum output is more than the output threshold, and the second remaining-amount parameter is less than a target remaining amount, power in the first power circuit to charge the second electric storage device.

7. An electric vehicle comprising the power supply system according to claim 1 mounted thereon, the electrical load including a drive motor mechanically coupled to drive wheels and a power converter that converts power between the first power circuit and the drive motor.

8. An electric vehicle comprising the power supply system according to claim mounted thereon, the electrical load including a drive motor mechanically coupled to drive wheels and a power converter that converts power between the first power circuit and the drive motor.

9. An electric vehicle comprising the power supply system according to claim mounted thereon, the electrical load including a drive motor mechanically coupled to drive wheels and a power converter that converts power between the first power circuit and the drive motor.

10. An electric vehicle comprising the power supply system according to claim 4 mounted thereon, the electrical load including a drive motor mechanically coupled to drive wheels and a power converter that converts power between the first power circuit and the drive motor.

11. The electric vehicle according to claim 7, further comprising an information display device that a driver is able to see, wherein the control device causes, when the first remaining-amount parameter is less than the remaining amount threshold, the information display device to display warning information regarding a state of the power supply system.

12. The electric vehicle according to claim 8, further comprising an information display device that a driver is able to see, wherein the control device causes, when the first remaining-amount parameter is less than the remaining amount threshold, the information display device to display warning information regarding a state of the power supply system.

13. The electric vehicle according to claim 9, further comprising an information display device that a driver is able to see, wherein the control device causes, when the first remaining-amount parameter is less than the remaining amount threshold, the information display device to display warning information regarding a state of the power supply system.

14. The electric vehicle according to claim 10, further comprising an information display device that a driver is able to see, wherein the control device causes, when the first remaining-amount parameter is less than the remaining amount threshold, the information display device to display warning information regarding a state of the power supply system.

15. An electric vehicle comprising:

a first power circuit coupled to a first electric storage device and an electrical load;

a second power circuit coupled to a second electric storage device having higher output density and lower energy density than output density and energy density of the first electric storage device;

a first remaining-amount parameter acquisition device that acquires a first remaining-amount parameter that increases or decreases in accordance with a remaining amount of the first electric storage device;

a first maximum output acquisition device that acquires a first maximum output that is a maximum output of the first electric storage device;

a voltage converter that converts a voltage between the first power circuit and the second power circuit; and a control device that operates the voltage converter to control a flow of power between the first power circuit and the second power circuit, the electrical load including a drive motor mechanically coupled to drive wheels and a power converter that converts power between the first power circuit and the drive motor, the control device restricts, when the first remaining-amount parameter is less than a remaining amount threshold and the first maximum output is more than an output threshold, discharging of the second electric storage device, compared with a case where the first remaining-amount parameter is more than the remaining amount threshold, the control device causes, when the first remaining-amount parameter is less than the remaining amount threshold, an information display device to display warning information includes information of a state where output power to the drive motor is restricted and information regarding a charging request to the first electric storage device.

16. The electric vehicle according to claim 12, wherein the warning information includes information of a state where output power to the drive motor is restricted and information regarding a charging request to the first electric storage device.

17. The electric vehicle according to claim 13, wherein the warning information includes information of a state where output power to the drive motor is restricted and information regarding a charging request to the first electric storage device.

18. The electric vehicle according to claim 14, wherein the warning information includes information of a state where output power to the drive motor is restricted and information regarding charging request to the first electric storage device.

* * * * *